US005570282A

United States Patent [19]
Hansen et al.

[11] Patent Number: 5,570,282
[45] Date of Patent: Oct. 29, 1996

[54] MULTIVARIABLE NONLINEAR PROCESS CONTROLLER

[75] Inventors: Peter D. Hansen, Wellesley Hills; Paul C. Badavas, Southboro, both of Mass.

[73] Assignee: The Foxboro Company, Foxboro, Mass.

[21] Appl. No.: 333,161

[22] Filed: Nov. 1, 1994

[51] Int. Cl.$^6$ ............................ G05B 13/02; G06F 15/18
[52] U.S. Cl. ...................... 364/148; 364/162; 364/165; 395/22
[58] Field of Search ...................... 364/148, 152, 364/153, 157–159, 160–163, 164, 165, 176, 177; 318/561; 395/21–24, 68, 903, 906

[56] References Cited

U.S. PATENT DOCUMENTS

| | | | |
|---|---|---|---|
| 5,111,531 | 5/1992 | Grayson et al. | 395/23 |
| 5,119,468 | 6/1992 | Owens | 395/22 |
| 5,121,467 | 6/1992 | Skeirik | 395/11 |
| 5,159,660 | 10/1992 | Lu et al. | 364/165 X |
| 5,175,678 | 12/1992 | Frerichs et al. | 364/148 |
| 5,197,114 | 3/1994 | Skeirik | 395/22 |
| 5,282,261 | 1/1994 | Skeirik | 295/22 |
| 5,396,416 | 3/1995 | Berkowitz et al. | 364/150 X |
| 5,404,289 | 4/1995 | Hang et al. | 364/148 |

FOREIGN PATENT DOCUMENTS

| | | | |
|---|---|---|---|
| WO9312476 | 6/1993 | WIPO | G05B 13/02 |
| WO9315448 | 8/1993 | WIPO | G05B 13/02 |

OTHER PUBLICATIONS

Application of Artificial Neural Networks for Nonlinear Model Predictive Control, Hong-Te Su, N. DiMascolo, T. McAvoy, Apr. 1993.

Primary Examiner—Joseph Ruggiero
Attorney, Agent, or Firm—Jules Jay Morris; Terrence Martin; David Barron

[57] ABSTRACT

A method and apparatus for a robust process control system that utilizes a neural-network multivariable inner-loop PD controller cascaded with decoupled outer-loop controllers with integral action, the combination providing a multivariable nonlinear PID and feedforward controller. The inner-loop neural-network controller is trained to achieve optimal performance behavior when future process behavior repeats the training experience. The outer-loop controllers compensate for process changes, unmeasured disturbances, and modeling errors. In the first and second embodiments, the neural network is used as an inner-loop controller in a process control system having a constraint management scheme which prevents integral windup by controlling the action of the outer-loop controllers when limiting is detected in the associated manipulated-variable control path. In the second and third embodiments, the neural-network controller is used without the integral controllers or the constraint management scheme as a simple PD feedforward controller.

54 Claims, 5 Drawing Sheets

MULTIVARIABLE NONLINEAR PROCESS CONTROLLER

BACKGROUND

1. Technical Field

This invention relates to industrial process controls, more particularly, for a method and apparatus for controlling multivariable, dynamic, nonlinear industrial processes.

2. Background Art

Industrial automation has continually strived towards attaining the optimum manner for controlling industrial processes in order to meet quality and production requirements. However, most modern industrial processes are complex requiring multiple control variables with interacting dynamics having time delays and lags, and nonlinearities. To handle such complex industrial processes, there have evolved various process control techniques.

Most current process control techniques determine the optimum operation of a process by monitoring one or more of the process's characteristics over time in order to adjust the operational parameters of the process. To compute the optimum operational parameters, especially in light of variations in the setpoint, system dynamics, and disturbances, these techniques may rely on a model of the plant process to predict the future behavior of the system. In some advanced techniques, this model, or part of it, is incorporated within a controller structure. The accuracy of these techniques relies on a precise dynamic model of the process. Such a model may not be available since some processes have uncertainties which cannot be modeled precisely or simply.

Recently, neural networks have become an attractive means for modeling complex processes. This is because a neural network has the inherent ability to approximate a multivariable nonlinear function. The neural network is also advantageous since it does not require a complete or precise understanding of the process. Rather, it can acquire a representation of the process through its capacity to be trained and to learn by example. A neural network has the additional capability of handling delayed variables and, hence, represent dynamic systems.

The application of neural networks in the process control area is a relatively recent development. Nevertheless, various neural-network control systems have been developed. One such type is a control system which uses neural networks in the well established model-predictive-control framework. Typically, these types of control systems use a controller, employing a model of the process, to determine the manipulated variable which will put the process at the target value. Process feedback is provided through a process-model-mismatch signal which is applied to the setpoint thereby compensating for unmodeled disturbances. This mismatch signal is the difference between the process output and a modeled process output generated by a neural network of the process.

The controller consists of a neural-network model and an optimizer. The neural-network model is used to predict the effect of possible manipulated variable trajectory on the process outputs over a future time trajectory taking into account present and recent past process input and output values. The optimizer uses this information to select values of the manipulated variables such that the process outputs optimally track the setpoints and satisfy a given set of constraints.

There are several limitations of this type of process control system. The primary limitation is that it does not handle effectively unmeasured load disturbances for a lag dominant process. Although the use of a model-error feedback gives the system the capability to handle well a dead-time dominant process, the method does not stabilize a non-self regulating or an open-loop-unstable process unless some additional feedback is applied. There is no proportional or derivative feedback, only a quasi-integral feedback action provided through the process-model-mismatch signal. Furthermore, the controller output-trajectory optimization is rerun at every control interval in order to determine the next manipulated variable change. This optimization may require substantial computation time requiring the interval between controller output updates to be undesirably large. This interval also adds further dead-time to the process dead-time thereby increasing the best achievable control error in response to an unmeasured load change.

It is an object of this invention to provide a robust and efficient process control system which accounts for the above mentioned limitations. More particularly, an optimal multivariable nonlinear control system which is robust, accommodates non-self regulating processes as well as pure dead-time processes, requires no on-line optimization, compensates to prevent upsets by measured loads, and combats unmeasured disturbances with high feedback gain.

Other general and specific objects of this invention will be apparent and evident from the accompanying drawings and the following description.

SUMMARY OF THE INVENTION

A method and apparatus for a robust process control system that utilizes a neural-network controller providing improved control of multivariable, nonlinear, dynamic processes is herein disclosed.

The process control system utilizes a quasi-inverse neural-network model of the process as an inner-loop multivariable proportional-and-derivative (PD) controller cascaded with decoupled outer-loop controllers which provide integral action, the combination providing a multivariable nonlinear proportional-and-integral-and-derivative (PID) and feedforward controller. The inner-loop neural-network PD controller is trained to achieve optimal performance when future process behavior repeats the training experience. The outer-loop controllers compensate for unmodeled process changes, unmeasured disturbances, and modeling errors by adjusting the inner-loop target values. Integral windup is prevented through a constraint management scheme which stops the integrating action of the controller when limiting is detected in its downstream path. Pairing of controlled and manipulated variables is useful in order to identify the downstream path associated with a particular outer-loop controller and is used to identify the effective delays of the closed inner loops.

There are four embodiments of this process control system. In the first and second embodiments, the process controller utilizes the combined multivariable nonlinear proportional-and-integral-and-derivative and feedforward controller with the constraint management scheme. The neural network is used as an inner-loop PD controller coupled with outer-loop integral controllers. The inner-loop PD controller produces the change in the manipulated variable needed to place the process at the desired setpoint level based on measurements of the process and their derivatives. The inner-loop PD controller also produces the optimum prediction time of the process which is used by the outer-loop integral controllers in performing integral action. In the first control embodiment, the inner-loop PD controller and the outer-loop controllers simultaneously receive feedback from the process through controlled variables sampled at a specified measurement rate. In the second control embodiment, the inner-loop controller receives process feedback through inferential variables made at a faster measurement rate thereby providing a quicker response to changes in the process. The integral controllers receive feedback through the controlled variables thereby providing integral action to adjust the setpoint to compensate for unmodeled errors, unmeasured disturbances, and the like.

In the third and fourth embodiments, the neural-network controller is used as a PD and feedforward controller without the outer-loop integral controllers or the constraint management scheme. In the third embodiment, the controller receives process feedback through the controlled variables thereby responding to changes in the process at the measurement rate. In the fourth embodiment, the controller receives feedback through inferential variables thereby producing a faster control response to changes in the process.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference characters refer to the same elements throughout the different views. The drawings are schematic representations of control elements, emphasis being placed on illustrating the principles of the invention.

DESCRIPTION OF THE ILLUSTRATED EMBODIMENT

Figure 1:
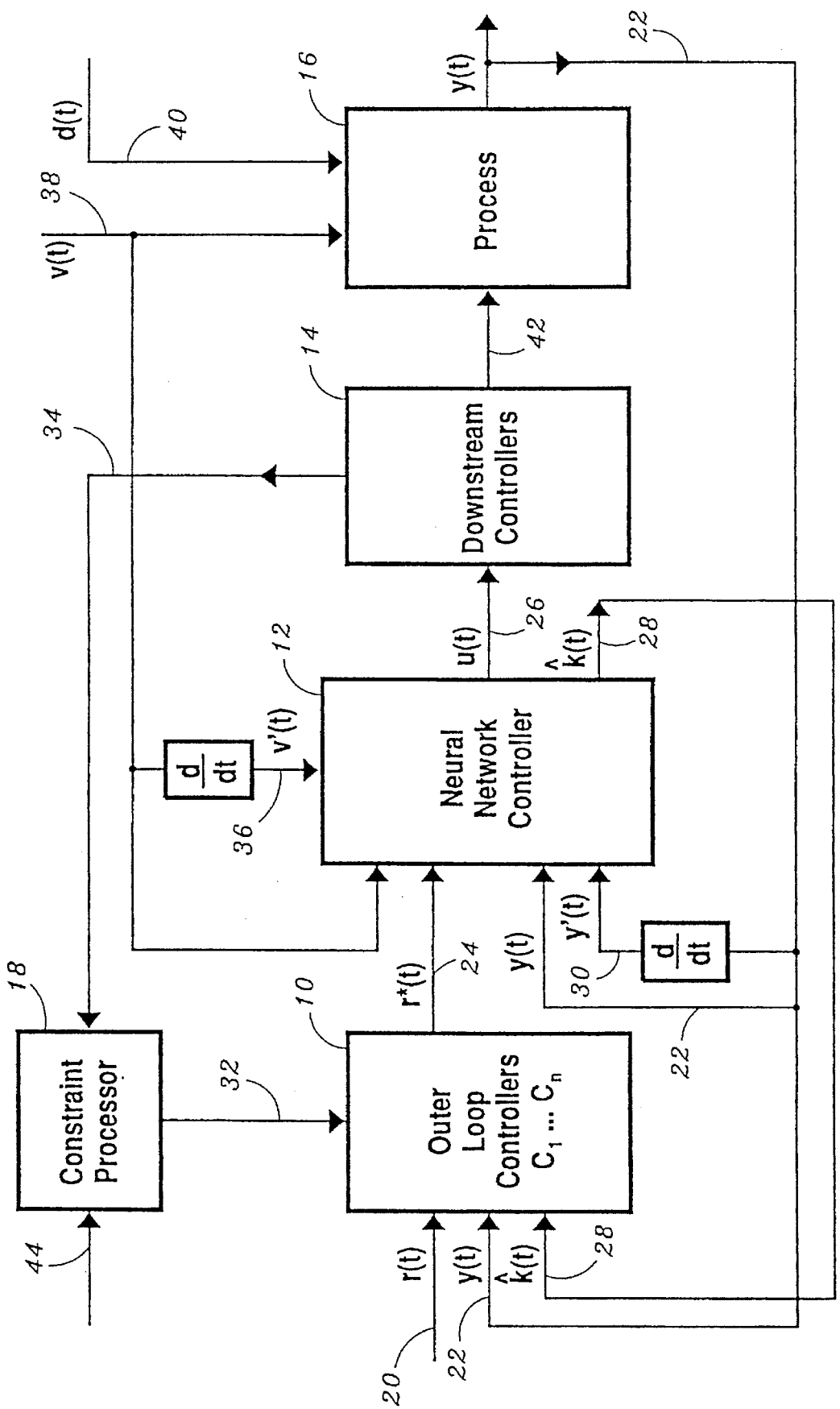
FIG. 1 illustrates the first embodiment of the process control system wherein the neural-network inner-loop PD controller is operated with controlled variable measurements and is cascaded with outer-loop controllers and a constraint management scheme.

Prior to describing the details of the invention, a brief synopsis of the signals used in the invention is presented first.

t is an integer representing a particular time step of the process.

r(t) outer-loop setpoint—the input signal which represents the target value of the process output at time step t.

r*(t) inner-loop setpoint—the input signal which has been adjusted by the outer-loop controller to compensate for unaccounted process dynamics, disturbances, and modeling errors.

u(t) manipulated variable—a vector of signals which represents a quantity or condition which is varied at time step t as to change the value of the controlled variable.

y(t) controlled variable—a vector of process output signals which represents the measured process output at time step t.

y'(t) derivative of the controlled variable—a vector of signals which represents the rate of change with respect to time of the measured process output at time step t.

w(t) inferential variable—a vector of process output signals which represents inferential values of the measured process output at time step t.

w'(t) derivative of the inferential variable—a vector of signals which represents the rate of change with respect to time of the inferential process output at time step t.

v(t) measured load variable—a vector of signals representing a known disturbance of a measured quantity occurring at time step t.

v'(t) derivative of the measured load variable—a vector of signals which represents the rate of change with respect to time of the measured load signal at time step t.

$\hat{k}(t)$ optimum prediction time—a vector of real numbers representing the relative time where the corresponding controlled variable, $y_i(t+\hat{k}_i(t))$, is most sensitive to a change in its paired manipulated variable. For the purposes of this application, the terms delay time, dead time, and optimum prediction time are used synonymously.

d(t) unmeasured load disturbance—a signal representing the disturbance caused by noise or load changes which is of an unmeasured quantity occurring at time step t. For the purposes of this application, when the above notations are used in the text and diagrams, they denote a vector of signals. For example, u(t) represents a vector of manipulated variable signals, $u_1(t) \ldots u_n(t)$, for i=1 to n.

This disclosure presents a process control system utilizing a neural-network PD controller. The controller can be trained off-line and in the manner as described in the first and second embodiments of copending application entitled "Method and Apparatus for Providing Multivariable Nonlinear Control", application Ser. No. 08/333,095, and filed the same date herewith, whose disclosure is herein incorporated by reference.

The neural network controller can be trained to produce, for each control loop, the optimum prediction time and the manipulated variable used to place the process rapidly at the desired operating level. The optimum prediction time becomes the effective response time of the controlled variable to the setpoint. This prediction time represents a future time where the greatest change in the controlled variable occurs as a result of a small change made to its paired manipulated variable. The optimum prediction time represents the situation where the least manipulated variable change is required to place the future controlled variable at its target value or setpoint. If another time were used, the manipulated variable change would be larger resulting in an over correction and therefore oscillatory and possibly unstable behavior.

The neural network can be a proportional-and-derivative controller since it receives as inputs proportional terms consisting of controlled variables or inferential variables, and measured load variables, and derivative terms consisting of the derivative values of the controlled variables or inferential variables and the derivatives of the measured load variables.

In the first and second control embodiments, the neural network can be used as an inner-loop PD controller coupled with outer-loop integral controllers and a constraint management scheme. The inner-loop PD controller produces the change in the manipulated variable needed to place the process at the desired setpoint level based on measurements of the process and their derivatives. The inner-loop PD controller also produces the optimum prediction time of the process which is used by the outer-loop integral controllers in performing integral action. In the first control embodiment, the inner-loop PD controller and the outer-loop controllers simultaneously receive feedback from the process through the controlled variables sampled at the measurement rate. In the second control embodiment, the inner-loop controller receives faster process feedback through inferential variables measured at a faster sampling rate thereby providing a quick response to process changes. The integral controllers receive feedback through the controlled variables thereby providing integral action to adjust the setpoint to compensate for unmodeled errors, unmeasured disturbances, and the like. Integral windup is prevented through a constraint management scheme which stops the integrating action of the controller when limiting is detected in its downstream path.

In the third and fourth embodiments, the process control system consists solely of the neural-network PD and feedforward controller without the outer-loop controllers or the constraint management scheme. In the third embodiment, the controller receives process feedback through controlled variables thereby responding to changes in the process at the measurement rate. In the fourth embodiment, the controller receives feedback through inferential variables thereby producing a faster control response to process changes.

FIG. 1 depicts the first process control embodiment. Referring to FIG. 1, the process control structure can be a PID controller consisting of outer-loop integral-type controllers, 10, cascaded with a PD neural-network controller, 12, cascaded with further controllers 14, downstream from the PD controller, which are coupled to a process 16, and a constraint processor 18. The downstream controllers 14 may include conventional control elements such as valves, actuators, and the like. The outer-loop controllers, 10, receive the outer-loop setpoints, r(t), 20, the controlled variables fedback from the process, y(t), 22, and optionally the optimum prediction times, $\hat{k}(t)$, 28, produced from neural network controller 12. The outer-loop controllers adjust the outer-loop setpoints producing inner-loop setpoints r*(t), 24. Controllers 10 can be implemented with general purpose computers, microprocessors, or dedicated controllers such as The Foxboro Company's 760 Series Controllers. Neural network controller 12 can be implemented in software, to be run on a CPU, in hardware through electronic circuitry, or as a hybrid system, partially implemented in software and partially in hardware.

The inner-loop controller, or neural network controller 12, receives inner-loop setpoints, r*(t), 24, the controlled variables fedback from the process, y(t), 22, the derivatives, with respect to time, of the controlled variables, y'(t), 30, the measured load variables, v(t), 38, and the derivatives, with respect to time, of the measured load variables, v'(t), 36. The outputs of inner-loop controller 12 are manipulated variables, u(t), 26, and optimum prediction times, $\hat{k}(t)$, 28. The manipulated variables can be transferred to downstream controllers 14 where they may be adjusted producing values 42 which are then transferred to process 16.

If the downstream controllers 14 limit any of the manipulated variables 26 (e.g. a fully open or closed valve), a logic signal, 34, indicating this limiting is produced from the downstream controllers and transmitted to a constraint processor 18. Constraint processor 18 responds to the limiting action in a number of ways as selected through signal 44. The response to the limiting action is represented by signal 32 which is transmitted to the appropriate outer-loop controller. The process receives the change in the manipulated variable needed to place it at the desired setpoint level, 42, and continues processing receiving measured loads, 38, and unmeasured disturbances, d(t), 40. At the appropriate measurement rate, the controlled variable is measured and transferred to inner-loop controller 12, and to outer-loop controllers 10. The function of these elements is described in more detail below.

The outer-loop integral controller contains n outer-loop controllers, 10, ($C_1 \ldots C_n$), one for each pair of controlled and manipulated variables. The outer-loop controllers 10 adjust the inner-loop setpoints producing, $r_1^*(t) \ldots r_n^*(t)$, 24. The outer-loop controllers use as inputs the outer-loop setpoints, 20, r(t), and the controlled variables, 22, y(t). Optionally, the optimum prediction times, 28, $\hat{k}(t)$, produced from neural network controller 12, can be used to determine the integral time constants for the outer-loop integral controllers. The use of the optimum prediction time is advantageous since it automatically tunes the integral controllers to adapt to the dynamic conditions of the process without requiring manual intervention or adaptive tuning.

The outer-loop controllers can employ pure integral action, PI action, or another type of integral action. For example, the PI action may be expressed mathematically for the i-th PI implementation as follows:

$$r_i^*(t) = x_i(t) + 0.2 \ [r_i(t) - y_i(t)] \quad (1)$$

where the integral term is represented by $x_i(t)$. The integral term, $x_i(t)$, may be calculated according to the following mathematical relations:

$$\text{initialize: } x_i(0) = y_i(0). \quad (2)$$

when downstream limiting occurs:

$$x_i(t+1) = x_i(t) \text{ OR } x_i(t) = x_i(t-1). \quad (3)$$

otherwise:

$$x_i(t+1) = x_i(t) + (r_i(t) - x_i(t))/(0.3 * \hat{k}(t)) \quad (4)$$

For the case where the outer-loop controllers employ pure integral action only, the outer-loop integral action may be expressed mathematically for the i-th integral implementation as follows:

$$r^*(t) = r^*(t-1) + [(r(t) - y(t)) * (1/(2 * \hat{k}(t) - 1))]. \quad (5)$$

In either case, the outputs from the outer-loop controllers are inner-loop setpoints, 24, r*(t), which are then transmitted to neural-network controller 12.

Neural-network controller 12 receives inner-loop setpoints 24 as well as the measured load variables 38, the derivatives of the measured load variables 36, the controlled variables 22, and the derivatives of the controlled variables 30. The feedback of these actual control measurements makes the controller a feedforward proportional-and-derivative controller. Neural network controller 12 then determines the optimum manipulated variables 26 and the optimum prediction times 28. The optimum prediction times 28 can be either transmitted to the outer-loop controllers 10, or discarded, and the selected values of the manipulated variables can be either transmitted to downstream controllers or directly to the process.

Further downstream controllers 14 may be utilized in the control system adjusting the manipulated variables as needed. If either the neural network or the downstream controllers set a manipulated variable at or beyond its threshold amount, a logic signal 34 is generated indicating the limited manipulated variable. Limiting occurs, for example, when a control element such as a valve is fully open and cannot satisfy the demands of the controller. Logic signal 34 is transmitted to constraint processor 18 which initiates a constraint signal 32 indicating a particular constraint action to be employed by outer-loop controllers 10. The particular constraint action that is to be taken is transmitted to the outer-loop controller of the corresponding limited manipulated variable through constraint signal 32.

Figure 2:
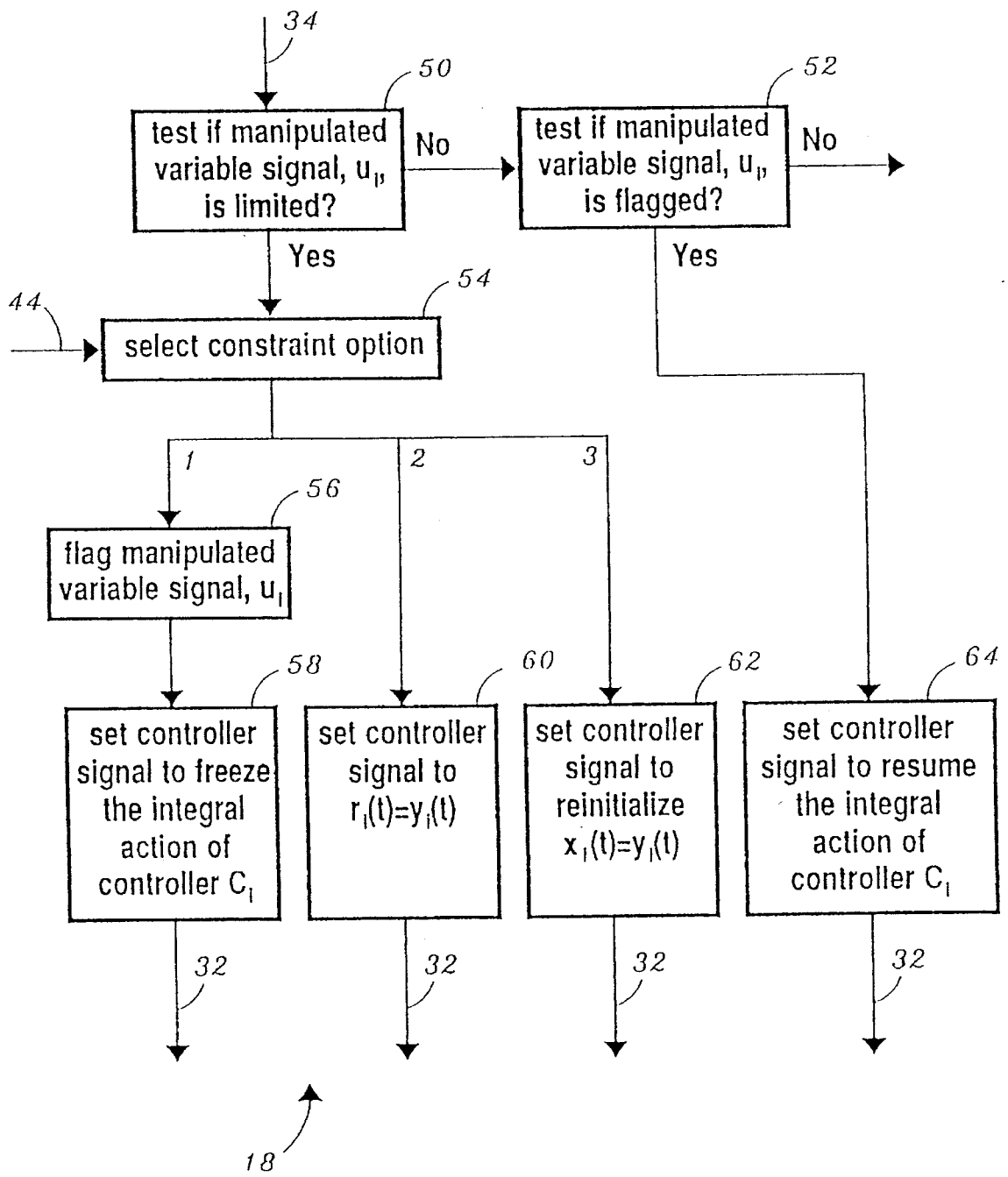
FIG. 2 is a flow chart illustrating the steps in the constraint management scheme as used in the first and second embodiments of the process control system.

FIG. 2 illustrates the steps that can be taken by constraint processor 18. Referring to FIG. 2, in step 50, the logic signal, 34, is tested to determine if the corresponding manipulated variable or a signal in its downstream path is limited (i.e. is at or has exceeded a threshold amount). If the signal indicates limiting, one of three possible constraint management options can be taken. The particular option is chosen through signal 44. The choice of a particular option is dependent on the particular application. In the first option, the associated manipulated variable is flagged in step 56, and in step 58 controller signal 32 can be used to set to temporarily freeze the integral action of the associated controller. For the second option, controller signal 32 can be used to set the setpoint of the associated controller, r(t), equal to the measurement, y(t), as in step 60. For example, if $u_i(t)$ is at its upper limit, then for outer-loop controller $C_i$, $r_i(t)=y_i(t)$. In the third option, controller signal 32 can be used to reinitialize the associated controller's integral term to the measurement, $x_i(t)=y_i(t)$. For those manipulated variables which were not limited, a further test can be made in step 52 to check if they were previously limited, in which case, controller signal 32 can be set to resume the integral action of the associated controller, in step 64.

Referring again to FIG. 1, each outer-loop controller produces a new inner-loop setpoint 24 which can be transmitted to neural network controller 12. Neural network controller 12, in turn, recomputes a new manipulated variable 26. Additional downstream controllers 14 may be employed providing further control action adjusting the manipulated variables producing values 42. Process 16 receives values 42 adjusting its operational parameters accordingly. The process proceeds in a continuous fashion encountering measured loads 38 and unmeasured disturbances 40.

The operation of the first control embodiment will be described below. At selected time intervals, controlled variables 22 and measured loads 38 can be sensed or measured through appropriate instrumentation and transmitted back to neural network controller 12 and outer-loop controllers 10 simultaneously. Typically, the measured properties of the process may include the flow rate, pressure, temperature, or fluid chemical composition. The derivatives of these signals can be obtained either from measurements through appropriate instrumentation or from computations by a processing element. These derivative signals can be transmitted to neural network controller 12. The neural network controller responds quickly to its input signals producing manipulated variables 26 and optimum prediction times 28. Initially, the adjusted setpoint, r*(t), 24, can be set equal to the setpoint, r(t). Manipulated variables 26 are transmitted to downstream controllers 14. Meanwhile, the outer-loop controllers 10 perform the slower integral control action producing adjusted setpoints 24 which can be used by neural network controller 12 at the next control interval. Downstream controllers 14 employ further control action producing adjustments to the manipulated variables 42 which can be utilized by the process. If a manipulated or downstream variable is limited, a signal, 34, indicating the limiting action can be transmitted to constraint processor 18. The constraint processor determines the appropriate constraint action and transmits this action through constraint signal 32 to the appropriate outer-loop controller. This entire process is then repeated at the next measurement interval.

Figure 3:
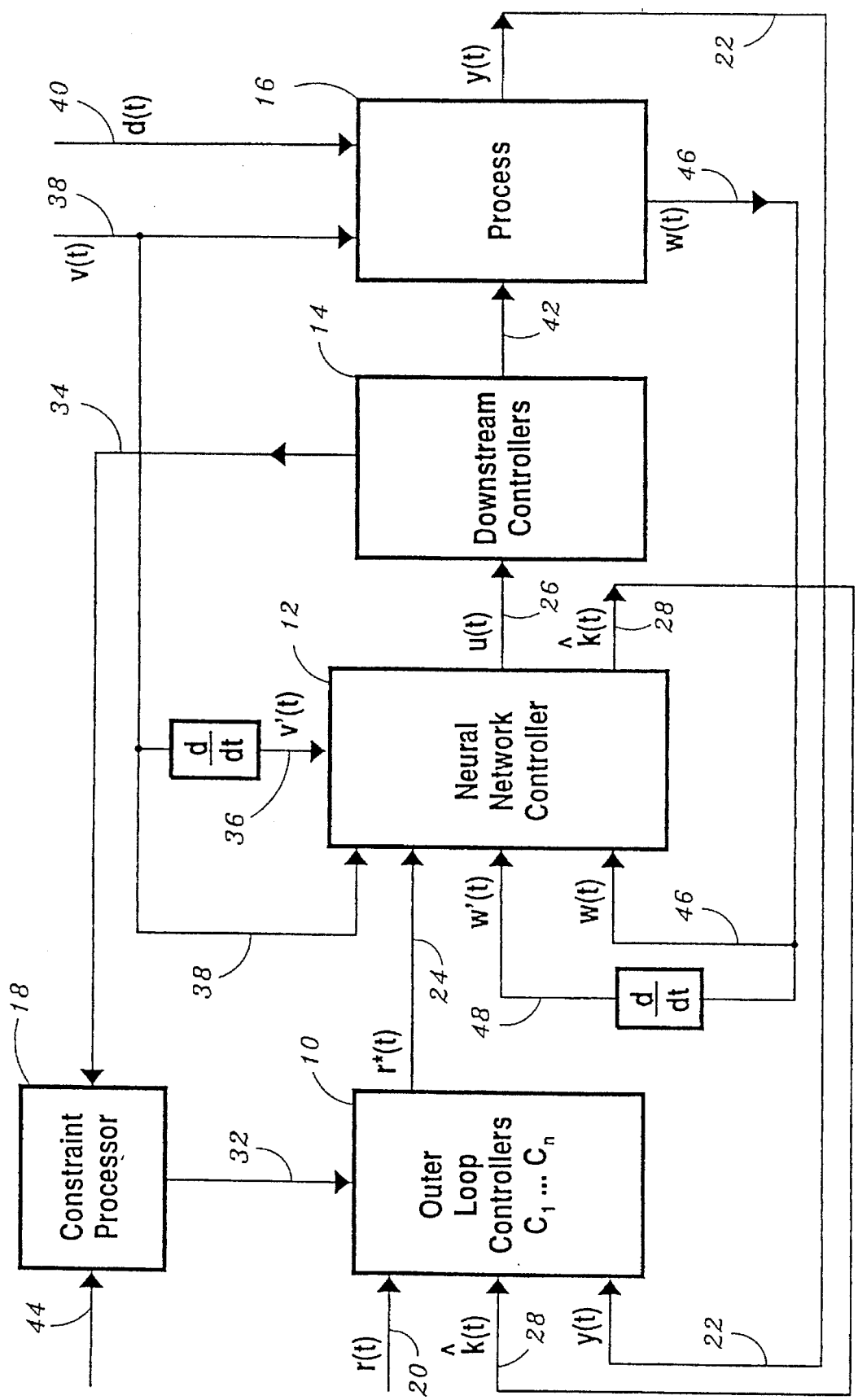
FIG. 3 illustrates the second embodiment of the process control system wherein the neural-network inner-loop PD controller is operated with inferential variables and cascaded with outer-loop controllers and a constraint management scheme.

FIG. 3 illustrates the second process control embodiment. Referring to FIG. 3, the physical structure of the second control embodiment is similar to the first embodiment. The process control structure employs a PID controller consisting of outer-loop integral-type controllers, 10, cascaded with a neural network controller, 12, cascaded with further controllers 14, downstream from the controller, which are coupled to a process 16, and a constraint processor 18. The outer-loop controllers receive process feedback through the controlled variables, y(t), 22, which are measured at selected time intervals.

The difference is in the process measurement that is fedback to inner-loop controller 12. Inner-loop controller 12 receives process feedback through inferential variables, w(t), 46, their derivatives, w'(t), 48, measured load variables, v(t), 38, and their derivatives, v'(t), 36, which are measured at a shorter time interval than of the controlled variables. Inferential variables are inferred approximations of the value of the controlled variables. They are typically continuous measurements made without detailed analysis. For example, in a distillation column, the controlled variable may be the chemical composition of the mixture and the inferential measurement may be the tray temperature from which the chemical composition may be inferred. The tray temperature is sampled continuously whereas the controlled variable is sampled at infrequent intervals requiring elaborate analysis. The use of the inferential variables by the inner-loop controller causes the process to operate at a faster control rate than the integral controllers, thereby providing a quicker response to changes in the process.

The operation of the second embodiment will be described below. Inferential variables, w(t), 46, are sensed or measured through appropriate instrumentation at a faster sampling rate and transmitted to inner-loop controller 12. The derivatives of the inferential variables, w'(t), 48, can be obtained either from measurements through appropriate instrumentation or from computations by a processing element and are transmitted to inner-loop controller, 12. The measured load variables, v(t), 38 and their derivatives, v'(t), 36 are also sampled at the same faster sampling rate and are transmitted to inner-loop controller 12 as well. The inner-loop controller then computes manipulated variables 42 which are transmitted downstream for use in affecting the process, and optimum prediction times 28 are transmitted to outer-loop controllers 10. The inner-loop controller operates continuously in this fashion utilizing the values of the adjusted setpoint r*(t), 24, which were last computed by the outer-loop controllers.

Simultaneously at selected measurement intervals, controlled variables 22 can be sensed or measured through appropriate instrumentation and transmitted back to outer-loop controllers 10. These measurements are made at a slower sampling rate than that of the inferential variables. The derivative of the controlled variables, 30, can be obtained either from measurements through appropriate instrumentation or from computations by a processing element and are transmitted to outer-loop controllers, 10. The outer-loop controllers also use the last values of the optimum prediction times, $\hat{k}(t)$, 28, which were transmitted from the inner-loop controller. The outer-loop controllers perform an integral control action using the optimum prediction times to determine the integral time constants, and produce adjusted setpoints, 24. These adjusted setpoints are then transmitted to the inner-loop controller.

Figure 4:
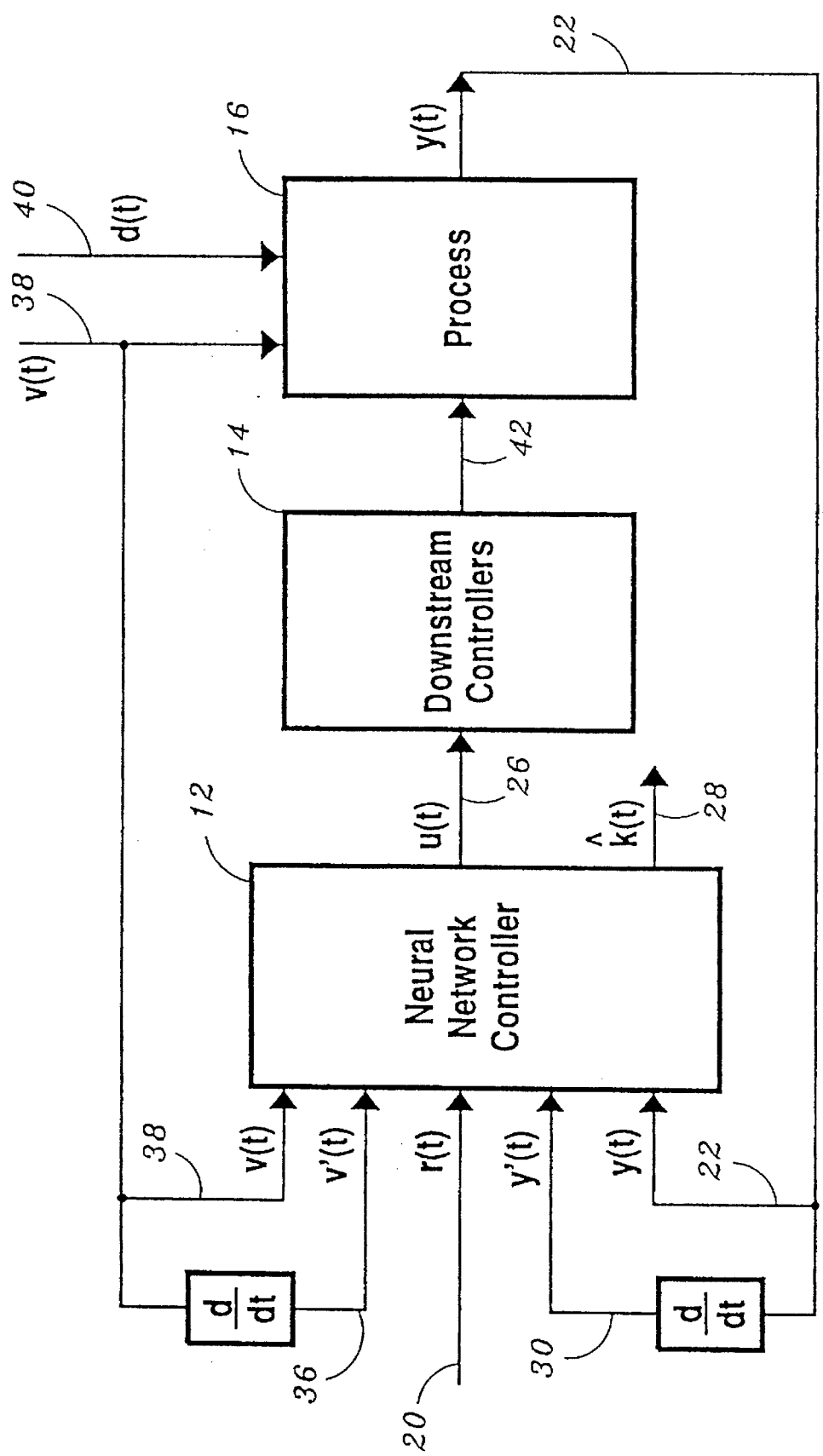
FIG. 4 illustrates the third embodiment wherein the process control system consists solely of the neural-network PD controller, which is operated with controlled variable measurements.

FIG. 4 illustrates the third process control embodiment which provides only PD control action performed by the neural-network controller. This type of control system is simpler and advantageous for processes that do not need integral control action. Referring to FIG. 4, this control system consists of neural-network PD controller 12, cascaded to downstream controllers 14, which are coupled to a process 16. Neural-network PD controller 12 receives measured load variables, v(t), 38, their derivatives, v'(t), 36, the outer-loop setpoints, r(t), 20, controlled variables, y(t), 22, and their derivatives, y'(t), 30. Neural-network controller 12 performs a PD control action producing manipulated variables, u(t), 26 and the optimum prediction times, $\hat{k}(t)$, 28. Manipulated variables, u(t), 26, can then be transmitted to downstream controllers, 14. The optimum prediction time is outputted but not used in this embodiment. The downstream controllers, 14, utilize the manipulated variables in their operation producing values, 42, which are used by the process to place it at the desired setpoints. The process proceeds in a continuous manner encountering measured loads, v(t), 38 and unmeasured disturbances, d(t), 40. At selected time intervals, the controlled variables are measured or sensed through appropriate instrumentation and fedback to neural-network controller 12. Thus, the process control structure of this embodiment is that of a feedforward proportional-and-derivative controller.

Figure 5:
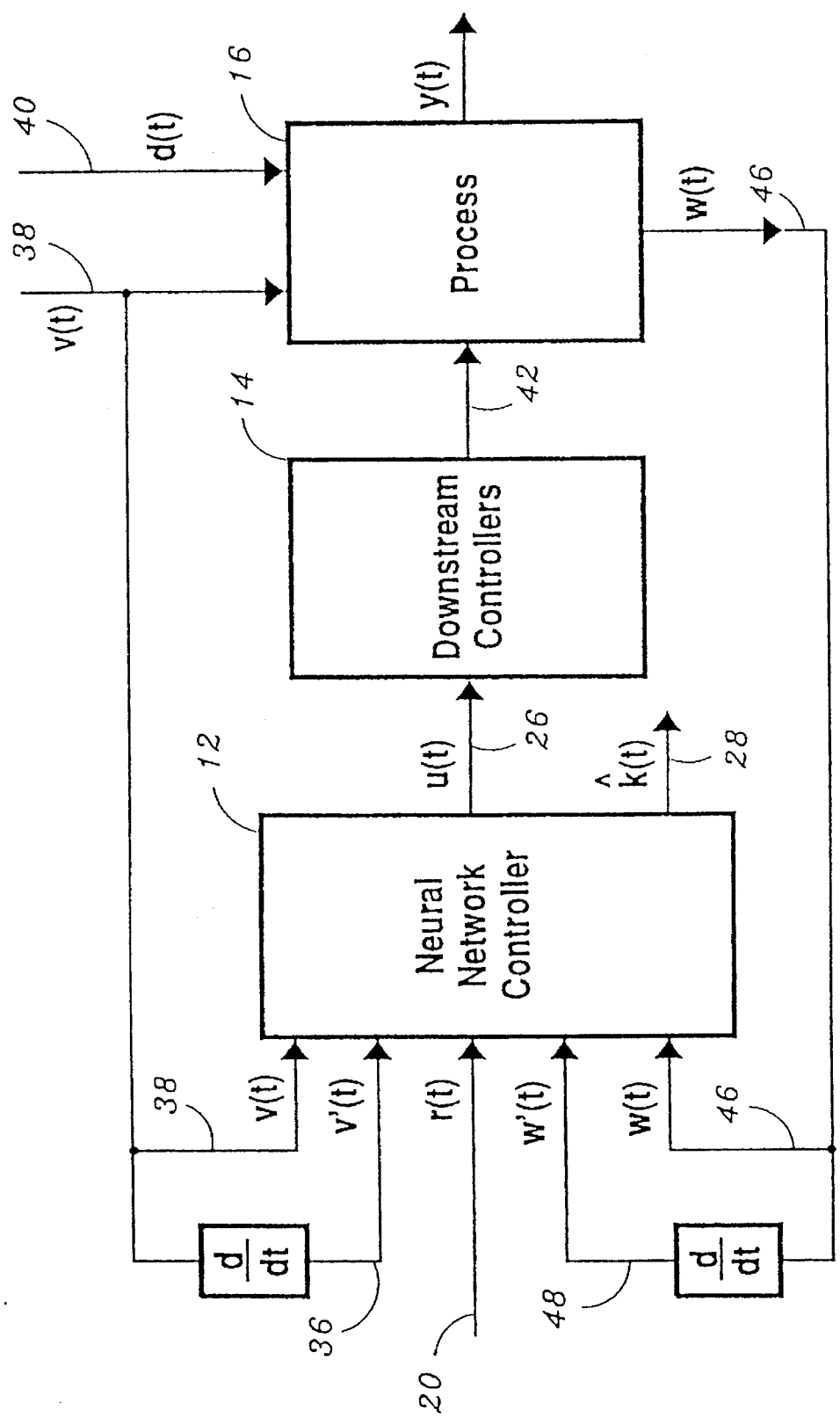
FIG. 5 illustrates the fourth embodiment wherein the process control system consists solely of the neural-network PD controller, which is operated with inferential variables.

FIG. 5 illustrates the fourth embodiment of the process control system. Referring to FIG. 5, this embodiment has the identical control structure as in the third embodiment. It employs neural-network PD controller, 12, used to produce manipulated variables, 26, which can be transmitted to downstream controllers, 14, which therein produce values, 42, which will adjust the process, 16, to place it at the desired setpoints. The difference lies in process feedback that neural-network controller 12 receives. The neural-network controller receives feedback through inferential variables, w(t), 46, their derivatives, w'(t), 48, measured load variables, v(t), 38, and their derivatives, v'(t), 36, which are sensed or measured through appropriate instrumentation at a shorter interval than that of the controlled variables. This faster feedback gives the controller in this embodiment the ability to respond quickly to process changes.

The operation of the fourth embodiment will be described below. Inferential variables w(t), 46, are sensed or measured through appropriate instrumentation at a faster sampling rate and transmitted to inner-loop controller 12. The derivatives of the inferential variables, w'(t), 48, can be obtained either from measurements through appropriate instrumentation or from computations by a processing element and are transmitted to inner-loop controller, 12. The measured load variables, v(t), 38 and their derivatives, v'(t), 36 are also sampled at the same faster sampling rate and are transmitted to inner-loop controller 12 as well. The inner-loop controller then computes manipulated variables 42 which are transmitted downstream for use in affecting the process, and optimum prediction times 28 can be discarded. The inner-loop controller operates continuously in this fashion utilizing the values of the setpoint r(t), 20.

This disclosure presents a robust process control system utilizing a neural-network PD controller for controlling multivariable, nonlinear, dynamic processes.

The preferred embodiments of this process control system have several advantages. First, they are effective at handling unmeasured load disturbances which makes them robust accommodating pure dead-time processes as well as non-self-regulating processes. This is because there is direct proportional and derivative feedback to the controller from the process. Furthermore, actual control measurements are fedback to the neural network instead of predicted values. This makes the overall process control system more effective at compensating to prevent upsets and combating unmeasured disturbances with feedback gain.

Second, the neural network controller is trained and optimized off-line thereby requiring no on-line computational overhead. Third, the neural-network controller receives independent inputs for the proportional terms, namely, the controlled variables or inferential variables, the inner-loop setpoints, and the measured load variables, and independent inputs for the derivative terms, namely, the derivatives of the controlled and measured load variables. These inputs give the controller, in essence, different proportional and derivative gains for each of these terms, thereby making the controller able to respond quickly and accurately to both changes in the setpoint and measured load disturbances without overshooting the response.

Additionally, the use of the inferential variables gives the inner-loop controller the capability of quickly responding to process changes. Control based on the prediction time that requires the smallest change of the manipulated variable assures that the process will not oscillate or overshoot but rather exhibit stable control. Furthermore, the use of the optimum prediction time to determine the time constant used by the outer-loop controllers is advantageous since it automatically tunes the integral controllers to adapt to the process's dynamic conditions without requiring manual intervention or adaptive tuning.

The various embodiments of this process control system are flexible permitting variations from the preferred embodiments in order to suit various types of processes. For example, for some processes, the derivative action may not be warranted. In such cases, the derivatives of the controlled variables and the measured load variables may be eliminated. This may be desirable for a dominant dead time process or a process with large measurement noise.

It should be further noted that in all of the aforementioned embodiments, the function of the neural network, either in its capacity as a controller, need not be performed by a neural network. The function of the neural network can be embodied in other types of data processing structures. Examples of such structures are, but not limited to, nonlinear function generator or characterizer, fuzzy logic processor, look-up tables, inferential logic machines, or by a processor utilizing a set of equations which would calculate the appropriate values for the signals generated.

Although the preferred embodiments of the invention have been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

We claim:

1. An apparatus for controlling a process having process inputs and process outputs comprising a controlled variable, the process responsive to a manipulated variable to vary the process in relation to the controlled variable, said apparatus comprising:

a) measuring means for measuring values of one of said process outputs generating a process output signal representative thereof;

b) setpoint means for receiving a setpoint which represents a target value of the controlled variable;

c) control means, coupled to said measuring means and the process, for generating a selected value of the manipulated variable as a function of the setpoint and the process output signal, said control means utilizing a nonlinear function generator previously trained to compute the selected value of the manipulated variable in accordance with an optimum prediction time, the optimum prediction time representing the effective response time of the process to a change in the setpoint, and the selected value of the manipulated variable representing a change in the process needed to move the controlled variable towards the setpoint as advanced by the optimum prediction time; and d) actuator means, coupled to said control means and said process, for applying the selected value of the manipulated variable to the process.

2. An apparatus as in claim 1 wherein said measuring means generates a derivative process output signal representative of the derivative, with respect to time, of the process output; and wherein said control means computes the manipulated variable in accordance with said function also including the derivative process output signal, said control means thereby providing a proportional and derivative control action.

3. An apparatus as in claim 1 further comprising a means for receiving measurements of process inputs; and wherein said control means computes the manipulated variable, in accordance with said function also including the process inputs, thereby providing additional feedforward control action.

4. An apparatus as in claim 3 wherein said process inputs further comprise a measured load variable representative of measured load disturbances.

5. An apparatus as in claim 4 wherein said process inputs further comprise a derivative measured load variable representative of the derivative, with respect to time, of the measured load variable.

6. An apparatus as in claim 1 further comprising an integral control means for providing integral control action in response to the process output signal, the setpoint, and an integral time constant, thereby calculating an inner setpoint in order to compensate for process changes, said integral control means producing the inner setpoint for use by the control means.

7. An apparatus as in claim 6 wherein said control means further generates the optimum prediction time for use in generating the integral time constant by said integral control means.

8. An apparatus as in claim 6 wherein said integral control means is selected from a PID controller, an integral controller, or a PI controller.

9. An apparatus as in claim 6 wherein said integral control means further comprises:

a) means for detecting limiting of the manipulated variable; and b) wherein said integral control means performs a control action in response to the limiting of the manipulated variable.

10. An apparatus as in claim 1 wherein the process outputs further comprise an inferential variable representative of an approximate indication of the controlled variable.

11. An apparatus as in claim 1 wherein said controlled variable is a measured process output.

12. An apparatus as in claim 1 wherein said apparatus is a multivariable controller and the process output signal further comprises a plurality of process output signals, the manipulated variable further comprises a plurality of manipulated variables, the setpoint further comprises a plurality of setpoints, and the optimum prediction time further comprises a plurality of optimum prediction times.

13. An apparatus as in claim 1 wherein said nonlinear function generator is a neural network.

14. An apparatus for controlling a process having process inputs and process outputs comprising at least one controlled variable, the process being responsive to at least one manipulated variable for changing the process in relation to the controlled variable, said apparatus comprising:

a) measuring means for measuring values of at least one of said process outputs and generating at least one process output signal representative thereof;

b) setpoint means for receiving at least one setpoint which represents a target value of the controlled variable;

c) control means, coupled to said measuring means and the process, for generating a selected value of the manipulated variable and at least one optimum prediction time as a function of the setpoint and the process output signal, said control means utilizing a nonlinear function generator previously trained to determine a selected value of the manipulated variable and the optimum prediction time, the optimum prediction time representing the effective response time of the process to a change in the setpoint, and the selected value of the manipulated variable representing a change in the process needed to produce a value of the controlled variable that approaches the setpoint as advanced by the optimum prediction time;

d) an integral control means for providing integral control action in response to the process output signal, the setpoint, and the optimum prediction time, thereby calculating an inner setpoint in order to compensate for process changes, the optimum prediction time being used in generating an integral time constant, said integral control means producing the inner setpoint for use by the control means; and e) actuator means, coupled to said control means and the process, for applying the manipulated variable to the process.

15. An apparatus as in claim 14 wherein said measuring means generates a derivative, with respect to time, of each process output signal; and wherein said control means computes each manipulated variable in accordance with said function also including the derivative of the process output signal, said control means thereby providing a proportional-and-derivative control action.

16. An apparatus as in claim 14 further comprising a means for receiving measurements of the process inputs; and wherein said control means computes each manipulated variable in accordance with said function also including the process inputs, thereby providing additional feedforward control action.

17. An apparatus as in claim 16 wherein said process inputs further comprise at least one measured load variable representative of measured load disturbances.

18. An apparatus as in claim 17 wherein said process inputs further comprise at least one derivative, with respect to time, of each measured load variable.

19. An apparatus as in claim 14 wherein said integral control means is selected from a PID controller, an integral controller, or a PI controller.

20. An apparatus as in claim 14 wherein said integral control means further comprises:
   a) means for detecting limiting of each manipulated variable; and
   b) wherein said integral control means performs a control action in response to the limiting of each manipulated variable.

21. An apparatus as in claim 14 wherein said controlled variable is a measured process output.

22. An apparatus as in claim 14 wherein said nonlinear function generator is a neural network.

23. An apparatus for controlling a process having process inputs and process outputs comprising at least one controlled variable and at least one inferential variable, the process responsive to at least one manipulated variable for changing the process in relation to the controlled variable, said apparatus comprising:
   a) a first measuring means for measuring values of a measured process output generating at least one controlled variable representative thereof;
   b) a second measuring means for measuring a process output thereby producing an approximate indication of the controlled variable and generating at least one inferential variable representative thereof;
   c) setpoint means for receiving at least one setpoint which represents a target value of the controlled variable;
   d) control means, coupled to said measuring means and the process, for generating a selected value of the manipulated variable and at least one optimum prediction time as a function of the setpoint and the inferential variable, said control means utilizing a nonlinear function generator previously trained to determine the selected value of the manipulated variable and the optimum prediction time, the optimum prediction time representing the effective response time of the process to a change in the setpoint, and the selected value of the manipulated variable representing a change in the process needed to produce the controlled variable that approaches the setpoint as advanced by the optimum prediction time;
   e) an integral control means for providing integral control action in response to the controlled variable, the setpoint, and the optimum prediction time, thereby computing an inner setpoint in order to compensate for process changes, the optimum prediction time being used for generating the integral time constant, said integral control means producing the inner setpoint for use by the control means; and
   f) an actuator means coupled to said control means and the process, for applying the manipulated variable to the process.

24. An apparatus as in claim 23
   wherein said measuring means generates at least one derivative, with respect to time, of each inferential variable; and
   wherein said control means generates each manipulated variable in accordance with said function also including the derivative of the inferential variable, said control means thereby providing a proportional-and-derivative control action.

25. An apparatus as in claim 24
   further comprising a means for receiving measurements of the process inputs; and
   wherein said control means produces each manipulated variable in accordance with the function including the process inputs, thereby providing additional control action for the process inputs.

26. An apparatus as in claim 25 wherein said process inputs further comprise at least one measured load variable representative of measured load disturbances.

27. An apparatus as in claim 26 wherein said process inputs further comprise at least one derivative, with respect to time, of each measured load variable.

28. An apparatus as in claim 24 wherein said integral control means is selected from a PID controller, an integral controller, or a PI controller.

29. An apparatus as in claim 24 wherein said integral control means further comprises:
   a) means for detecting limiting of each manipulated variable; and
   b) wherein said integral control means performs a control action in response to the limiting of each manipulated variable.

30. An apparatus as in claim 23 wherein said nonlinear functin generator is a neural network.

31. A multivariable nonlinear controller for controlling a process having process outputs comprising of at least one controlled variable, and an actuator affecting the process, the controller comprising:
   a) means for receiving a signal representative of at least one of the process outputs;
   b) means for receiving at least one setpoint indicating a target value of the controlled variable;
   c) control means, in communication with the process output signal and the setpoint, said control means, utilizing a nonlinear function generator to produce at least one selected value of the manipulated variable to affect the process, said control means performing the operations of:
      i) performing an integral control action using the process output signal, the setpoint, and an integral time constant, and generating at least one adjusted setpoint representative thereof;
      ii) operating the nonlinear function generator as a function of the process output signal and the adjusted setpoint, and producing an optimum prediction time representing a response time of the controlled variable to the adjusted setpoint, the optimum prediction time used to compute the integral time constant for the integral control action, the nonlinear function generator producing the selected value of the manipulated variable for affecting the controlled variable as advanced by the optimum prediction time; and
      iii) transmitting the selected value of the manipulated variable to the actuator for affecting the process.

32. A controller as in claim 31 wherein said means for receiving at least one process output signal
   further comprises a means for computing and generating at least one derivative, with respect to time, of the process output signal and wherein the step of operating the nonlinear function generator is performed in accordance with said function also including the derivative of the process output signal.

33. A controller as in claim 31 wherein said means for receiving at least one process output signal further comprises a means for receiving at least one measured load variable representative of measured load disturbances and wherein the step of operating the nonlinear function generator is performed in accordance with said function also including the measured load variable.

34. A controller as in claim 33 wherein said means for receiving at least one measured load variable further comprises a means for computing and generating at least one derivative measured load variable representative of the derivative, with respect to time, of the measured load variable and wherein said operation of the nonlinear function generator is performed in accordance with said function also including the derivative measured load variable.

35. A controller as in claim 31 wherein said step of performing integral control action is selected from a PID controller, an integral controller, or a PI controller.

36. A controller as in claim 31 wherein the step of performing integral control action further comprises the step of detecting limiting of each manipulated variable and performing the integral control action in response to the limiting.

37. A controller as in claim 31 wherein the nonlinear function generator is a neural network.

38. A multivariable nonlinear controller for controlling a process having a process output comprising controlled and inferential variables, and an actuator affecting the process, the controller comprising:

a) means for receiving at least one process output signal;

b) means for generating at least one inferential variable representing approximate indications of the controlled variable;

c) means for receiving at least one setpoint indicating a target value of the controlled variable;

d) control means, in communication with the process output signal and the setpoint, said control means, utilizing a nonlinear function generator to produce at least one selected value of the manipulated variable to affect the process, said control means performing the operations of:

i) performing an integral control action using the process output signal, the setpoint, and an integral time constant, and generating at least one adjusted setpoint representative thereof;

ii) operating the nonlinear function generator in response to the inferential variable and the adjusted setpoint, and producing an optimum prediction time representing a response time of the controlled variable to the adjusted setpoint, the optimum prediction time used to generate the integral time constant for the integral control action, the nonlinear function generator producing the selected value of the manipulated variable for affecting the controlled variable to approach the setpoint as advanced by the optimum prediction time; and iii) transmitting the manipulated variable to the actuator for affecting the process.

39. A controller as in claim 38 further comprising a means for computing and generating at least one derivative, with respect to time, of the inferential variable and wherein the step of operating the nonlinear function generator is performed in accordance with said function also including the derivative of the inferential variable.

40. A controller as in claim 38 further comprising a means for receiving at least one measured load variable representative of measured load disturbances and wherein the step of operating the nonlinear function generator is performed in accordance with said function also including the measured load variable.

41. A controller as in claim 38 further comprising a means for computing and generating at least one derivative measured load variable representative of the derivative, with respect to time, of the measured load variable and wherein said operation of the nonlinear function generator is performed in accordance with said function also including the derivative measured load variable.

42. A controller as in claim 38 wherein said integral control action of the step performing integral control action is selected from a PID controller, an integral controller, or a PI controller.

43. A controller as in claim 38 wherein the step of performing integral control action further comprises the step of detecting limiting of each manipulated variable and performing the integral control action in response to the limiting.

44. A controller as in claim 38 wherein the nonlinear function generator is a neural network.

45. A method for controlling a process having process inputs, process outputs comprising of at least one controlled variable, and an actuator affecting the process, the method utilizing a nonlinear function generator for computing at least one manipulated variable for use by the actuator to affect the controlled variable, the method comprising the steps of:

a) measuring the process output generating at least one process output signal representative thereof;

b) receiving at least one setpoint representing the target value of the controlled variable;

c) operating the nonlinear function generator as a function of the process output signal and the setpoint to generate a selected value of the manipulated variable, the nonlinear function generator previously trained to generate the selected value of the manipulated variable based on an optimum prediction time, the optimum prediction time representing a response time of the controlled variable to the setpoint, and the selected value of the manipulated variable representing a change made to the process in order to affect the controlled variable to approach the setpoint as advanced by the optimum prediction time; and d) transmitting the manipulated variable to the actuator for applying the manipulated variable to the process.

46. A method as in claim 45 wherein the step of measuring the process output further comprises the step of computing at least one derivative, with respect to time, of the process output generating at least one derivative process output signal representative thereof; and wherein the step of operating the nonlinear function generator is performed with said function also including the derivative of the process output signal in order to generate the manipulated variable.

47. A method as in claim 45 wherein the step of measuring the process output further comprises the step of measuring load disturbances of the process generating at least one measured load variable representative thereof; and wherein the step of operating the nonlinear function generator is performed with said function also including the measured load variable in order to generate the manipulated variable.

48. A method as in claim 45 wherein the step of measuring load disturbances further comprises the step of computing the derivative, with respect to time, of at least one measured load variable and generating at least one derivative measured load variable representative thereof; and wherein said step of operating the nonlinear function generator is performed with said function also including the derivative measured load variable in order to generate the manipulated variable.

49. A method as in claim 45 wherein the process output is at least one controlled variable representing a measured process output.

50. A method as in claim 45 wherein the process output is at least one inferential variable representing an approximate indication of the controlled variable.

51. A method as in claim 45 wherein the nonlinear function generator is a neural network.

52. A system for controlling a process, the process having process inputs, process outputs comprising of a plurality of controlled variables, and an actuator affecting the process, the system comprising:
   a) first control means for generating a plurality of selected values of the manipulated variables for use by the actuator for affecting the process, said first control means performing the steps of:
      i) measuring load disturbances of the process and generating a plurality of measured load variables representative thereof and generating the derivative, with respect to time, of the measured load disturbances, thereby producing a plurality of derivative measured load variables representative thereof;
      ii) measuring a plurality of process outputs generating a plurality of process output signals representative thereof and generating the derivative of the process output signal producing a plurality of derivative process output signals representative thereof;
      iii) receiving a plurality of adjusted setpoints representing values of the controlled variables for use by the first control means in determining the selected values of the manipulated variables;
      iv) producing the selected values of the manipulated variables and a plurality of optimum prediction times as a function of the adjusted setpoints, the measured load variables, the derivative measured load variables, the inferential variables, and the derivative inferential variables, the optimum prediction time representing a response time of the controlled variable to the adjusted setpoint, and the selected values of the manipulated variable representing changes made to the process in order to affect the controlled variables to approach the adjusted setpoints as advanced by the optimum prediction time;
      v) transmitting the selected values of the manipulated variable to the actuator for application to the process;
   b) second control means for generating the adjusted setpoint by performing the steps of:
      i) receiving a desired setpoint representing a target value of the process;
      ii) measuring the process thereby generating a controlled variable representative thereof;
      iii) determining whether the manipulated variable has been limited and generating a logic signal representative thereof; and
      iv) calculating the adjusted setpoint by performing an integral control action as a function of the desired setpoint, the controlled variable, the logic signal, and the optimum prediction time produced from said first control means, said calculation step producing the adjusted setpoint for use by the first control means in generating the manipulated variables which will affect the process.

53. A system as in claim 52 wherein said process output signals are controlled variables representing measured process outputs.

54. A system as in claim 52 wherein said process output signals are inferential variables representing approximate indications of the controlled variables.

\* \* \* \* \*